Oct. 4, 1932.   H. A. WADMAN ET AL   1,880,542
CONTROL SYSTEM
Filed Dec. 17, 1930    3 Sheets-Sheet 1
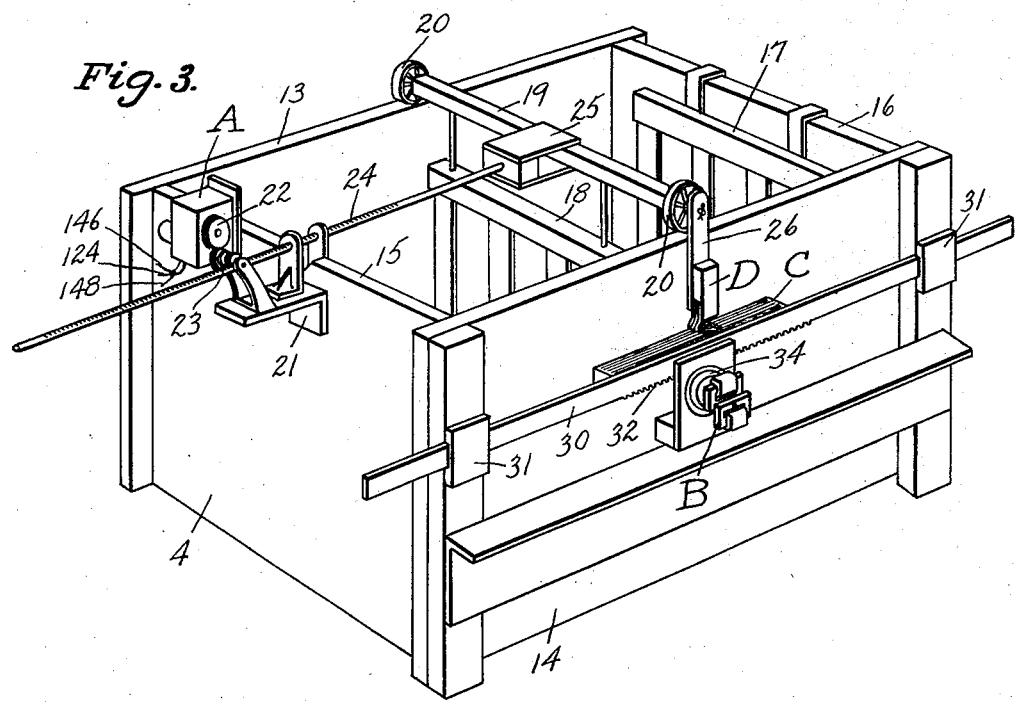
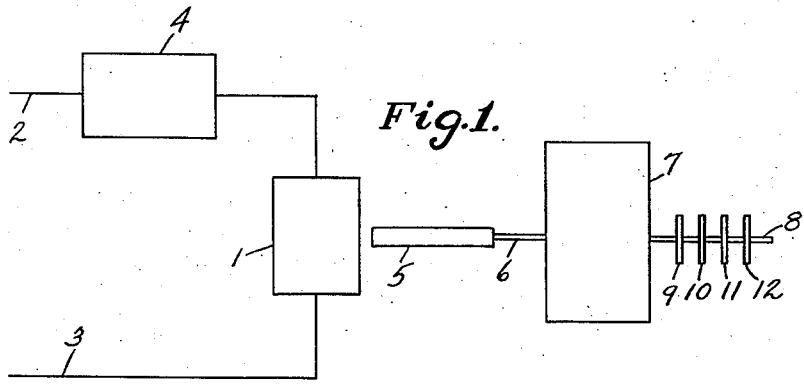
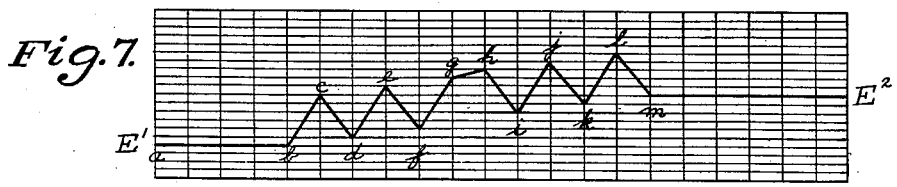
Witness:
G. Q. Duburg.
Inventors;
Harold A. Wadman
Harold W. McIntosh
by Brown & Parham
Attorneys.

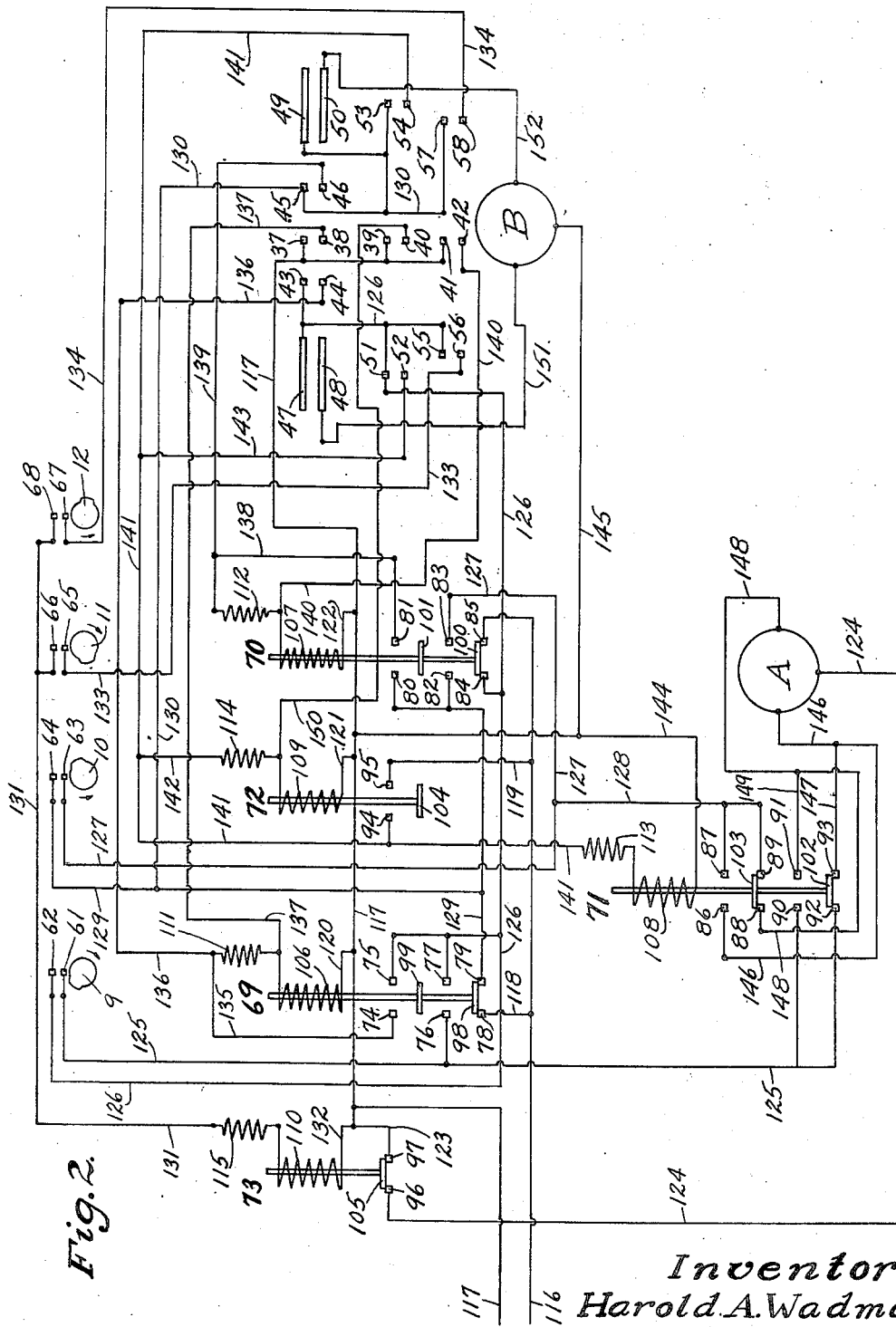

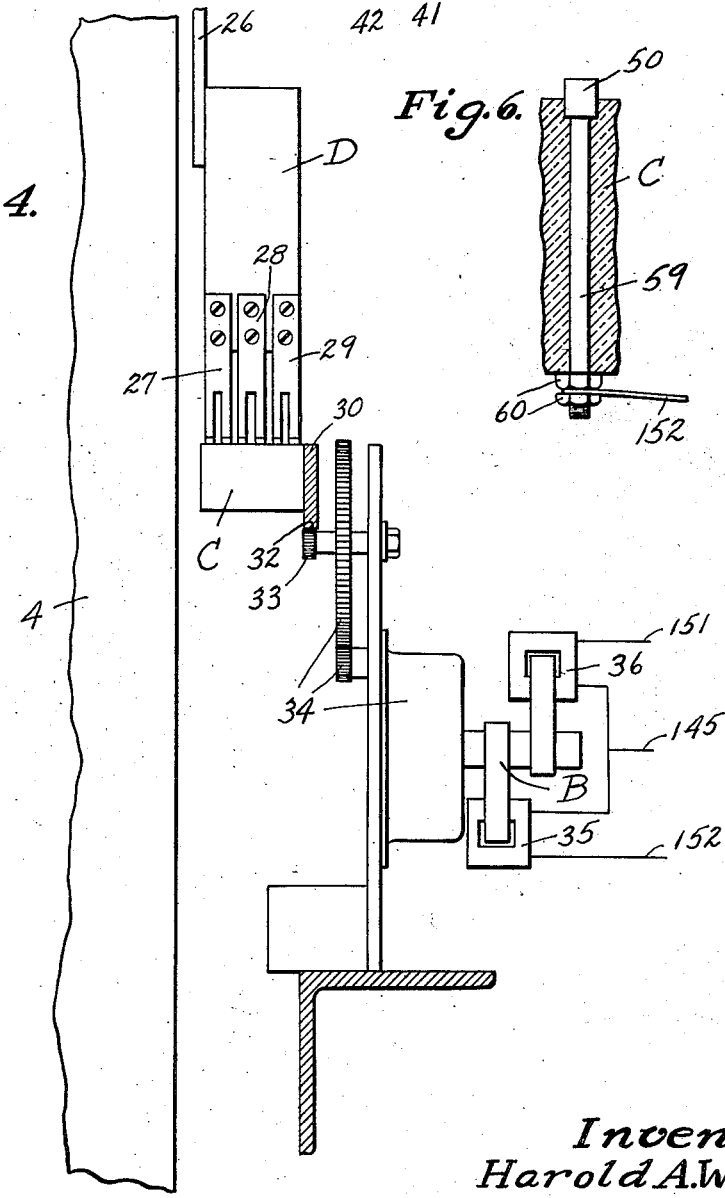

Patented Oct. 4, 1932

1,880,542

UNITED STATES PATENT OFFICE

HAROLD A. WADMAN, OF HARTFORD, AND HAROLD W. McINTOSH, OF WINDSOR, CONNECTICUT, ASSIGNORS TO HARTFORD-EMPIRE COMPANY, OF HARTFORD, CONNECTICUT, A CORPORATION OF DELAWARE

CONTROL SYSTEM

Application filed December 17, 1930. Serial No. 503,004.

This invention relates to an automatic control system, whereby in response to certain changes in the magnitude of a condition, which may be thermal, electrical, mechanical, physical or chemical, a control is effected, particularly to change or vary the magnitude of the condition to restore it quickly to a predetermined desired magnitude.

More particularly the invention relates to an automatic means responsive to variations or changes in the magnitude of a condition which is to be controlled for controlling the rate of supply of some substance or medium which in turn may directly control the magnitude of the condition, the object being to maintain the condition at a predetermined desired magnitude by properly controlling the rate of supply of said substance or medium.

Our invention has particular application to the control of the temperature in a predetermined region at which it is desired to maintain a given selected temperature, the control being accomplished by a control of the rate of supply of a temperature controlling medium, which may be a heating medium, the purpose being to maintain a desired temperature at some index point within closer limits and with less variation than has been possible with prior devices.

In controlling the temperature of a heated region, such for example as a furnace in response to the temperature thereof, there is used, according to this invention and according to the prior art, some temperature responsive device which is arranged through some suitable control system to regulate the temperature at the region in question. We have found, however, that regulation as effected by prior art devices does not take care of the two elements for which it is necessary to compensate, at least in a quick and efficient manner. For example, if the temperature of the furnace be too low due to some new circumstance, and this fact is recorded on an instrument or controlling device, the rate of supply of heat is too small. This rate must, therefore, be increased so as to provide for continuous operations and maintenance of the desired temperature under the new conditions. In order that the temperature responsive device be actuated, the temperature in the furnace must fall below the desired point, so that at the time of initiation of the operation of the control system, the heat condition or the heat content of the furnace, or parts thereof, or material or articles therein is less than that were the temperature as great as desired. There must also, therefore, be a certain predetermined amount of heat supplied to the furnace in order to bring the temperature conditions back to those desired. If the rate of supply of heating medium to the furnace be merely increased by a certain amount calculated to be sufficient under the new conditions, the parts will take a considerable time in regaining their desired temperature and theoretically, at least, will never quite reach it. If, on the other hand, the rate of supply of heat be increased sufficiently to bring the furnace and parts thereof or articles therein up to the desired temperature quickly, this rate of heat supply is too great, and the normal result is that the temperature in the furnace will rise to a value greater than that desired, so that a continuous variation must be carried on which can at best only result in approximating the desired conditions. Thus, in controls as effected by the prior art, the actual temperature in a furnace governed by an automatic control wanders first on one side of the desired value and then on the other and is not maintained at the desired value for any material period of time.

An object of the present invention therefore is to accomplish regulation of a condition, for example, the temperature in a furnace, by a two-fold operation: first, assuming the temperature in the furnace to be too low, by the supplying of a relatively large amount of heat or the supplying of the heating medium at a relatively high rate for a predetermined short period of time in order quickly to bring conditions in the furnace back to those desired, and subsequently or simultaneously to adjust the normal rate of supply of the heating medium to the new operating conditions. It is sometimes sufficient to do only the first of these things, i. e., to supply heating medium at a relatively high rate (assuming the same low temperature conditions) for the relatively short time, thereafter bringing the rate of supply back to the original rate. Such a control is to be considered within the purview of this invention.

A further object of this invention is to provide a control system which will carry out the above set forth succession of controlling steps (treating the embodiment of the invention hereinafter described as applied to control of the temperature in a furnace) whether or not the temperature responsive device remains in its position showing a temperature different from that desired for the whole time the control system is in operation. Also our invention includes a provision for the cycle of operations and adjustments to be carried on again and again as long as the temperature remains above or below that desired.

Our invention further is adapted to accommodate a situation and to effect a control under circumstances in which the magnitude of the condition being controlled is a material amount different from that desired and to effect this control in a manner quicker than if only the above referred to successive control steps were carried on.

A further object of our invention is to provide further means by which, when the actual condition, as for example the temperature of the furnace, is more than a predetermined amount different from the desired conditions, the rate of supply of the condition-controlling substance or medium, for example of the heating medium, which controls the conditions will be varied more rapidly than could be done by the increment control referred to above, the purpose being to restore conditions to those desired as quickly as possible and to maintain such conditions with the controlling apparatus inactive for as large a percentage of the time as is possible, thereby resulting in the maintenance of the magnitude of the controlled condition more nearly constant than is possible with prior devices.

Further objects of the invention include the variability of different parts of the system to compensate for special circumstances met with when applying the system to different situations. For example, it is possible that in controlling the temperature of a particular furnace, a greater change in the rate of supply of heat may be required to compensate for 1° drop in temperature than would be required if the temperature were 1° too high.

Other objects and advantages of our present invention will become apparent from a reading of the following specification and sub-joined claims, when considered in conjunction with the accompanying drawings, in which:

Figure 1 is a diagrammatic representation of a system including an electric furnace, the temperature of which is to be controlled, a means for controlling the supply of electricity thereto, and a temperature responsive device to which our control system may be applied;

Fig. 2 is a diagrammatic illustration of a system of electric circuits which may be used in carrying out the invention;

Fig. 3 is a perspective view of a water rheostat which may be used as a voltage controlling means for the power supply to the electric furnace and to which the control system of our invention may be applied;

Fig. 4 is a detailed view showing certain of the mechanisms of Fig. 3, particularly the means for moving the contact-carrying member and also the relative position and construction of the contactor member;

Fig. 5 is a plan view of the contact-carrying member showing an arrangement of the contacts thereon which may be used;

Fig. 6 is a fragmentary view in vertical transverse section of a portion of the contact-carrier member showing how a contact may be adjustably secured therein; and Fig. 7 is a chart representing variations in the rate of current supply resulting from operations of the system of our invention.

While we herein show and describe our system as being applied to the control of a water rheostat which governs the voltage of the electric power circuit of an electric furnace, it should be understood that the system of our invention may be advantageously utilized in controlling and maintaining any condition, whether thermal, electric, mechanical, physical or chemical, which is effective to operate some recording or indicating instrument or mechanism by which any operating member may be moved in one direction or the other according as the magnitude of the condition to be controlled varies in one way or the other from a desired magnitude. Even if our system be considered as applied to a heat control, it is applicable whether the heating is accomplished by the use of electricity, or a combustible material such as coal, oil, gas or other combustibles, or hot water, steam, or other means, the only limitation being that such means be capable of regulation as to its rate of supply, and that the condition, to wit, the temperature, is variable according as the rate of supply of such heating medium is varied. The present specific embodiment is therefore to be considered merely as an example of one use to which our invention may be applied. Furthermore, while we have illustrated in Fig. 3 a water rheostat, it will be obvious that any other type of rheostat, an induction regulator or variable period current interruptor might be used in an electric circuit to an electric furnace all within the purview of our invention. Furthermore, when a "heating medium" is referred to hereinafter and in the claims, it will be understood that this term is intended to include in its scope all types of media productive of heat, such for example as electricity, coal, oil, gas, hot air or water and steam, and others, as aforesaid. Other variations all within the purview of our invention will suggest themselves as the description of one specific embodiment thereof proceeds.

Elements of system

Referring now to Fig. 1, there is illustrated diagrammatically a simple system including an electric furnace 1, which may be used for the melting of glass or some other material, or for any other desired purpose, and which is supplied with electric current from the power supply lines 2 and 3. The heat may be supplied to the furnace either by conduction through the glass in the case of a glass furnace, in which the glass is used as the resistor, or by passing the current through suitable resistance coils, or by induction. Also in Fig. 1 there is illustrated diagrammatically a voltage regulator 4 interposed between two sections of the conductor 2 by which the voltage used in connection with the electric furnace may be regulated, and thus regulating the rate of supply of current or "heating medium" to the furnace 1.

Suitably associated with the furnace is a temperature responsive device illustrated diagrammatically as a radiation pyrometer 5 connected through suitable conductors enclosed in a cable 6 with an indicating device 7, which may be of the type shown in the patent to Schofield, Jr., 1,683,809, issued September 11, 1928, (see especially Fig. 1 of that patent). Such a device may include a galvonometer having a suitable needle with or without mechanism for recording declinations of that needle, and a mechanism actuated from an independent source of power by which a shaft shown in Fig. 1 of the accompanying drawings at 8 is rotated in one direction or the other, according as the temperature in the furnace 1 rises or falls, the degree or amount of such rotation being proportional to the degree or amount of such rise or fall in temperature. Such shaft is shown in the Schofield patent at 10 (see Fig. 1) and carries cams numbered 34 and 38. This device, or some device similar thereto, is a commercial product and the specific construction thereof forms no part of the present invention. The apparatus hereinafter to be specifically described and embodied in the present invention is adapted to be operated and controlled in response to movements in one direction or the other of some operating member, a temperature responsive device such as the patented device referred to being indicated diagrammatically for the purpose of showing one type of operating member, to wit, the shaft 8, which may be used in controlling a system such as that presently to be described. It will be understood, however, that it is unnecessary that the operating member be rotated, as a member which is translated in one direction or the other in response to variations in the magnitude of a condition to be controlled may be used equally well. In the device as diagrammatically shown in Figs. 1 and 2, the shaft 8 is provided with a plurality of cams 9, 10, 11 and 12, with which are associated switches later to be described.

Water rheostat—construction and operation

Referring now to Fig. 3, there is shown a box-like structure used as a tank for water which is the resistor used in the rheostat 4. The tank is built up in any suitable manner, and as shown comprises sides 13 and 14, ends 15 and 16, and a bottom, not shown. The water in the tank is preferably somewhat saline, so as to conduct electricity, salt being added to the water until the normal position of the movable contact of the rheostat is substantially midway of the ends of the box.

A fixed plate electrode or lattice structure 17 is arranged at one end 16 of the box and is suitably connected with one of the portions of the conductor 2, as seen in Fig. 1. A movable plate electrode or lattice 18 is suitably supported upon a carriage 19, which is arranged to travel from end to end of the box, as shown, the carriage being provided with wheels 20 running on suitable rails on the top edges of sides 13 and 14 of the box. Suitable insulating means are provided between the plates 17 and 18 and other structures which might conduct electricity.

Means are provided for moving the movable plate 18 to increase or decrease the distance between the plates 17 and 18 and thus to decrease or increase the rate of current flow through the electric furnace 1, such means comprising a reversible electric motor A mounted as shown on one end 15 of the rheostat box on a suitable bracket 21 and provided with a speed reducing means 22 as a gear train, the motor A being arranged to drive pinion 23 which meshes with suitable rack teeth provided on a bar 24 fixed at its inner end at 25 to the carriage 19. Thus, when the motor A is actuated in one direction or the other, the carriage 19 and the plate 18 carried thereby will be moved toward or away from the fixed plate 17 thus decreasing or increasing the resistance introduced in series with the electric furnace 1 and varying the rate of supply of power thereto. While we have shown a very simple form of water rheostat for effecting this control, it will be obvious that any other type of voltage or current controlling device may be used without departing from the spirit of our invention.

*The contactor, contact-carrier and movement thereof*

As seen in Figs. 3 and 4, the carriage 19 is provided with a downwardly extending member 26 rigid therewith and carrying at its lower end a sliding spring contactor D, comprising an insulating member having secured thereto a plurality, in this case three, electrical conducting bridging contact members 27, 28 and 29, for purposes later to be described. These bridging contacts are formed of spring metal as shown in Fig. 3 and bear downwardly upon suitable contacts carried by a contact-carrier C.

The contact-carrier C is, in the construction shown, fixed to a horizontally reciprocable bar 30, which is arranged to slide in suitable guides 31, one at each end of the rheostat box 4, so that the contact-carrier C is movable in a path parallel to the path of movement of the rheostat member or plate 18. It is obvious that should a type of rheostat be used in which the control is effected by a rotative movement, the contact-carrier C could be made in circular or cylindrical form without departure from the spirit of our invention, the only essential being that the contact-carrier C be movable in the same way as the movable member of the rheostat with which it is associated. Also, any other control means could be substituted in place of a rheostat for electric current control and the contact-carrier C associated with such other control means.

For moving the contact-carrier C, the member or bar 30 is provided with downwardly directed rack teeth 32 with which meshes the pinion 33 arranged to be driven through speed reducing mechanism 34 from the reversible motor B. As shown in Fig. 4, the motor B has two field coils 35 and 36 which are arranged to be used to operate the motor armature in one direction or the other as desired and thus to move the contact-carrier C in one direction or the other. The speed reduction mechanism associated with the motors A and B are such that the movement of the carriage 19 and hence the contactor D by the motor A always proceeds at a faster rate than the movement of the contact-carrier C by the motor B, so that when both are moving at the same time and in the same direction, there will still be a differential movement between the contactor D and the contact-carrier C.

*Arrangement and adjustment of contacts on carrier*

Referring to Fig. 5, the contact-carrier C is shown provided with a plurality of contacts which may be arranged in symmetry about its mid-position from side to side, certain contacts being arranged at the exact center. These contacts at the center are numbered 37, 38, 39, 40, 41 and 42 and are arranged permanently in this center position. Contacts 43 and 44 are arranged slightly to the left of contacts 37 and 38, respectively, as shown in Fig. 5, and contacts 45 and 46, respectively, slightly to the right of contacts 37 and 38. These contacts (43 to 46, inclusive,) may be adjustable to the right or left, as seen in Fig. 5, that is longitudinally of the contact-carrier C for purposes later to be described. In alignment with and beyond contacts 43 and 44, respectively, are long contacts 47 and 48, respectively, at the left; and in alignment with and beyond contacts 45 and 46 are the long contacts 49 and 50, respectively. Contacts 47 to 50, inclusive, are also adjustable longitudinally of the contact-carrier C. In alignment with contacts 39 and 40 at the left (as seen in Fig. 5) are contacts 51 and 52, and at the right are contacts 53 and 54, these contacts being spaced a material distance from contacts 39 and 40, respectively, and being adjustable longitudinally of the contact-carrier C. Spaced from (as seen in Fig. 5) and respectively in alignment with center contacts 41 and 42, are contacts 55 and 56 at the left and 57 and 58 at the right. These contacts 55 to 58, inclusive, are not spaced as far from the center of contact-carrier C as are contacts 51 and 52 on the one hand and contacts 53 and 54 on the other, for reasons set forth hereinafter.

In Fig. 6 is shown in fragmentary cross-section a portion of the contact-carrier C provided with a slot perpendicular to the plane of the section in which is received a contact as 50. The contact is provided with one or more stems 59 projecting through the slot on which stems are threaded suitable nuts 60 for securing the contacts in desired adjusted position and for connection with a suitable conductor by which the contact is connected in the circuit shown in Fig. 2. The contact has an enlarged head which is received in a wider slot adjacent to the top of the contact-carrier C, the contact thus being retained against lateral or rotative movement even in the case where only one pin or stem as 59 is used in securing it in position.

*Electric circuits and switches for effecting control*

While it is conceivable that our automatic control may be effected in a number of different ways, we prefer to use a system of electric circuits and suitable automatic control switches for effecting the desired control, such circuits being initially made and energized by one or more of the cams 9, 10, 11 and 12, which as shown are rotated to open and close associated switches by the operation of the temperature responsive instrument as above set forth. These switches are operative to initiate certain operations which in turn cause the energization of certain relays. The relays and certain other mechanism, some of which has been described above, cooperate together to cause a series of operations in a predetermined cycle, whether or not the cam which initiated the operations remains in the position which initiated such operations.

We will first describe the various elements of the electrical circuits and the connection therebetween and then describe the operation of the system.

Cams 9, 10, 11 and 12 each cooperates with a suitable movable switch member of a two-point switch. As shown in Fig. 2, cam 9 is operable to connect switch contacts 61 and 62; cam 10 is operable to connect switch contacts 63 and 64; cam 11 is operable to connect switch contacts 65 and 66; and cam 12 is operable to connect switch contacts 67 and 68.

There are provided as shown in the diagram, Fig. 2, two main circuit controlling relay switches 69 and 70, a motor reversing relay switch 71, a maintaining relay switch 72 and a cut-off relay switch 73. Switch 69 is provided with pairs of contacts 74—75, 76—77 and 78—79. Relay switch 70 is provided with similar pairs of contacts 80—81, 82—83, and 84—85. The reversing relay switch 71 is provided with pairs of contacts 86—87, 88—89, 90—91 and 92—93. The maintaining switch 72 is provided with a single pair of contacts 94—95. The relay switch 73 is likewise provided with a single pair of contacts 96—97. The switches 69 and 70 are each provided with two bridging members 98—99 for switch 69 and 100—101 for switch 70. The reversing relay switch 71 is also provided with two bridging members 102—103. Switches 72 and 73 are provided each with a single bridging member numbered 104 and 105, respectively.

Relay switches 69 to 73, inclusive, are respectively provided with energizing windings 106 to 110, inclusive. Connected to one terminal of each of the energizing windings 106 to 110 is one terminal of resistances 111 to 115, respectively, these resistances serving to prevent the passage of excessive current if the energizing winding of the associated relay is shorted to de-energize the relay, which operation occurs in the case of relay switches 69, 70 and 72 whenever the contactor D is centrally disposed with respect to the contact-carrier C, as hereinafter to be described. The resistances 113 and 115 for switches 71 and 73, respectively, may be omitted without variation in the function of these relay switches or the remainder of the circuits.

Current is supplied to the system by line conductors 116 and 117 from any suitable source of power. Conductor 116 is connected to contact 78 of relay switch 69 by conductor 118, to contact 95 of relay switch 72 by conductor 119 and at its end is connected to contact 85 of relay switch 70. Conductor 117 is connected to one terminal of coil 106 of relay 69 by conductor 120, to coil 109 of relay 72 by conductor 121, to coil 107 of relay 70 by conductor 122, and by suitable connection to contacts 37, 39 and 41 on the contact-carrier C. Connection is also made from conductor 117 through conductor 123 to contact 97 of relay switch 73. Contact 96 of this switch is connected by conductor 124 to the common terminal of reversible motor A.

Referring now to the connections of cam switches 9, 10, 11 and 12, contact 61 operable by cam 9 is connected by a conductor 125 with contact 76 of relay switch 69 and also with contacts 90 and 92 of relay switch 71. Contact 62 of the said cam operated switch is connected by conductor 126 with contacts 75 and 77 of relay switch 69, with contact 84 of relay switch 70 and with contacts 51, 55, 43 and 47 on the contact-carrier C.

Contact 63 of the switch operated by cam 10 is connected by a conductor 127 with contact 83 of relay switch 70 and also by a connecting conductor 128 with contacts 87 and 89 of relay switch 71. Contact 64 of the switch operated by cam 10 is connected by a conductor 129 with contacts 79 of relay switch 69 and contacts 80 and 82 of relay switch 70. A branch conductor 130 connects conductor 129 with contact points 45, 49, 53 and 57 on the contact-carrier C.

Referring now to the connections for the switches operated by cams 11 and 12, contacts 66 and 68 of these switches respectively are connected by a common conductor 131 with one terminal of resistance 115 associated with relay 73, the other terminal of this resistance being connected to one terminal of the energizing coil 110 of that relay. The other terminal of energizing coil 110 is connected with line conductor 117 by a conductor 132. Contact 65 of the switch operated by cam 11 is connected by a conductor 133 with contact 56 on the contact-carrier C. Contact 67 of the switch controlled by cam 12 is similarly connected by conductor 134 with contact 58 on the contact-carrier C.

Referring now to the connections for relay switch 69, all of the contacts of this switch except contact 74 have been included in the above description. Contact 74 is connected by a conductor 135 with one terminal of the resistance 111 associated with that relay switch, the said terminal being connected also by a conductor 136 with contact 44 on the contact-carrier C. The common connection between the resistance 111 and the energizing coil 106 of the relay switch 69 is connected by a conductor 137 with contact 38 on the contact-carrier C.

Similarly with respect to relay switch 70, contact 81 of this switch is connected by a conductor 138 with one terminal of the resistance 112 associated with this relay, which terminal is also connected by a conductor 139 with contact 46 on the contact-carrier C. The common connection between the resistance 112 and the energizing coil 107 of relay 70 is connected by a conductor 140 with contact 42 on the contact-carrier C.

Considering now the connections for the relay switch 71, the resistance 113 and energizing coil 108 of this switch are connected in series as shown, the other terminal of the resistance 113 being connected by a conductor 141 with contact 94 of relay switch 72, and through conductor 142 with one terminal of the resistance 114 associated with relay switch 72, and through conductor 143 with contact 52 on the contact-carrier C, and also the end of conductor 141 with contact 54 on the contact-carrier C. The other terminal of the energizing relay coil 108 for relay switch 71 is connected by a conductor 144 directly to the line conductor 117 and also through a branch conductor 145 with the common terminal of motor B. Contacts 86 and 93 of the relay switch 71 are connected by conductors 146 and 147, respectively, with one terminal of the motor A and contacts 88 and 91 of this switch are similarly connected with the other terminal of motor A through conductors 148 and 149, respectively.

The common connection between resistance coil 114 and energizing coil 109 of relay 72 is connected by a conductor 150 with contact 40 on the contact-carrier C.

Referring now to the connections for motor B, other than the common connection 145 for the two windings which has been described, the other terminal of one winding is connected by a conductor 151 with long contact 48 on the contact-carrier C, and the other terminal on the other winding is connected by a conductor 152 with long contact 50 also on the contact-carrier C.

*Operation*

In Fig. 2 is shown the position of all parts of the system when the cam operated switches are all open, due to the magnitude of the condition being controlled being that desired. At this time contactor D is located centrally of contact-carrier C, so that contact member 27 connects contacts 37 and 38, contact member 28 connects contacts 39 and 40, and contact member 29 connects contacts 41 and 42. All the relays 69 to 73, inclusive, are de-energized and the switches respectively controlled thereby are positioned as follows: relay switch 69 is positioned so that member 98 connects contacts 78 and 79 and the other contacts of this switch are open; relay switch 70 is positioned so that member 100 connects contacts 84 and 85 and the other contacts of the switch are open; relay switch 71 is positioned so that member 103 connects contacts 88 and 89 and member 102 connects contacts 92 and 93, the other contacts of the switch being open; relay switch 72 is positioned so that contacts 94 and 95 are open; and relay switch 73 is positioned so that member 105 connects contacts 96 and 97. Under these circumstances motors A and B are not in operation.

Let us assume now that the magnitude of the condition being controlled is too little by a relatively small amount, for example the temperature of the furnace 1 falls 1 or 2 degrees below the desired temperature according as the system is set. Under these circumstances the operating member or cam shaft 8 will be rotated in a particular direction to rotate the cam 10 so as to connect contacts 63 and 64, the other cam switches remaining open. This will result in closing a circuit through the motor A to initiate its operation to move the rheostat in a corrective direction, to the right, as seen in Fig. 3, the circuit being traceable as follows: line conductor 116, conductor 118, contact 78, member 98 and contact 79 of relay switch 69, conductor 129, contacts 64 and 63 of the switch operated by cam 10, conductors 127 and 128, contact 89, member 103 and contact 88 of relay switch 71, conductor 148, motor A, common conductor 124, contact 96, member 105 and contact 97 of relay switch 73, and conductor 123 to line conductor 117. Thus far there has been no variation in the position of any of the relays or of other parts of the system.

The actuation of the motor A serves to move the movable plate 18 (Fig. 3) of the rheostat in a corrective direction or toward the fixed plate 17, thus increasing the rate of supply of power to the furnace in the instant case. When this operation has carried on a predetermined time, member 27 of the contactor D will engage and connect contacts 45 and 46 on the contact-carrier C, at the same time disconnecting the pairs of contacts 37—38, 39—40 and 41—42. Connection of contacts 45 and 46 on the contact-carrier C serves to maintain the motor A in operation should the cam 10 be later returned to its neutral position prior to the completion of a single complete cycle of the control apparatus.

The first step in tracing through the cycle is the energization of relay 70 which is accomplished by the connection of contacts 45 and 46 on the contact-carrier C. This energization takes place through a circuit which may be traced as follows: starting with line conductor 116, through conductor 118, contact 78, member 98 and contact 79 of relay switch 69, conductors 129 and 130, contact 45, bridging member 27 of contactor D, contact 46 on the contact-carrier C, conductor 139, resistance 112 and energizing coil 107 of relay switch 70, and conductor 122 to line conductor 117. Energization of coil 107 moves the switch members of relay switch 70 so that member 100 connects contacts 82 and 83 and member 101 connects contacts 80 and 81.

Movement of the switch 70 results in maintaining motor A in operation even though the cam 10 is later moved to break the connection between contact 63 and 64. The maintained circuit for motor A may be traced as follows: starting with line conductor 116, through conductor 118, contact 78, member 98 and contact 79 of relay switch 69, conductor 129, contact 82, member 100 and contact 83 of relay switch 70, conductors 127 and 128, contact 89, member 103, and contact 88 of relay switch 71, conductor 148, motor A, conductor 124, contact 96, member 105 and contact 97 of relay switch 73, and conductor 123 to line conductor 117.

In order that the maintained circuit for the motor A be kept closed and the movable plate 18 be continuously moved toward the fixed plate 17 by operation of this motor after the conductor D has moved on to disconnect contacts 45 and 46, a maintaining circuit for the relay switch 70 is provided as follows: starting with line contactor 116, through conductor 118, contact 78, member 98 and contact 79 of relay switch 69, conductor 129, contact 80, member 101 and contact 81 of relay switch 70, conductor 138, resistance 112 and energizing coil 107 of relay switch 70 in series, and conductor 122 to line conductor 117. Thus, it will be seen that until something further happens to change conditions in the system, the motor A will be maintained in operation and the rate of supply of current in the particular case herein described will be progressively increased.

Contactor D is thus continuously moved until connecting member 27 thereof engages and connects long contacts 49 and 50. This will result in the completion of a circuit through motor B to move contact-carrier C in the same direction in which the movable contact plate is being moved by the motor A. The circuit for actuating motor B in this direction is as follows: starting with line conductor 116, through conductor 118, contact 78, member 98 and contact 79 of relay switch 69, conductors 129 and 130, contact 49 on contact-carrier C, through contact member 27 of contactor D, contact 50 on contact-carrier C, conductor 152, motor B, common conductor 145 of this motor, and conductor 144, to line conductor 117. As before stated, the movement of the contact-carrier C by the motor B is relatively slower than is the movement of the carriage 19 by the motor A, so that motor A, which is still in operation, will continue to cause a differential movement in the same direction between contactor D and contact-carrier C.

The next pair of contacts to be connected are 57 and 58, but inasmuch as the switch operated by cam 10 is assumed to be the only one closed, no new action will take place at this time.

The relative movement of contactor D with respect to contact-carrier C will be continued until member 28 on contactor D engages and connects contacts 53 and 54. This will cause a reversal of the direction of operation of motor A by opening the circuit which operated this motor in the initial direction and closing a circuit for operating it in the opposite direction, other parts of the system including motor B remaining in operation, as above described.

This reversal of the operation of the motor A is effected by the energization of the solenoid coil 108 operating relay switch 71. The circuit which is closed by connecting contacts 53 and 54 for energizing the coil 108 of relay switch 71 is as follows: starting with line conductor 116 through conductor 118, contact 78, member 98 and contact 79 of relay switch 69, the conductors 129 and 130 to contact 53 on contact-carrier C, through bridging member 28 of contactor D, contact 54, conductor 141, resistance 113 and coil 108 of relay switch 71 in series, and conductor 144 to line conductor 117. This will result in member 102 of relay switch 71 bridging contacts 90 and 91 and member 103 of that switch bridging contacts 86 and 87.

Motor A will now be connected in a circuit to operate in the opposite direction, the circuit being traceable as follows: starting with line conductor 116, through conductor 118, contact 78, member 98 and contact 79 of relay switch 69, conductor 129, contact 82, member 100 and contact 83 of relay switch 70, conductors 127 and 128, contact 87, member 103 and contact 86 of relay switch 71, conductor 146, the motor A, common conductor 124, contact 96, member 105 and contact 97 of relay switch 73, and conductor 123 to line conductor 117.

Inasmuch as the motor A has now started to operate in the opposite direction thus to move the fixed and movable plates of the rheostat 4 further apart and starting to decrease the rate of supply of current to the furnace, contactor D will now be moving to the left and contact-carrier C will continue to move to the right, both as seen in Fig. 3. Under these circumstances member 28 of contactor D will quickly be moved out of engagement with contacts 53 and 54. Means must be provided, therefore, to maintain motor A in operation in this reverse direction by the continued energizing of the solenoid coil 108 of relay switch 71. Such means in the circuit illustrated include relay switch 72 which when closed maintains the solenoid of relay switch 71 energized. Relay switch 72 is closed by the connection of contacts 53 and 54 through a circuit which may be traced as follows: starting with line conductor 116, through conductor 118, contact 78, member 98 and contact 79 of relay switch 69, conductors 129 and 130 to contact 53, bridging member 28 of contactor D, contact 54, conductors 141 and 142, resistance 114 and solenoid coil 109 of relay switch 72 in series, and conductor 121, back to line conductor 117. Thus, relay switch 72 will be energized as soon as the contactor D is moved to a point to connect contacts 53 and 54. This will result in the maintenance of relay switch 71 in its energized position to maintain the operation of motor A in the new direction by a circuit starting with line conductor 116, through conductor 119, contact 95, member 104 and contact 94 of relay switch 72, conductor 141, resistance 113 and solenoid winding 108 of relay 71 in series, and conductor 144 to line conductor 117. Means are also provided to maintain relay switch 72 energized when contactor D breaks the circuit including contacts 53 and 54 on the contact carrier C, such maintained circuit for relay switch 72 being traceable as follows: starting with line conductor 116, through conductor 119, contact 95, member 104 and contact 94 of relay switch 72, conductors 141 and 142, resistance 114 and solenoid coil 109 of relay switch 72 in series, and conductor 121 to line conductor 117.

We now have a condition in which contact-carrier C is being moved to the right, as seen in Fig. 3, by the motor B and contactor D is being moved to the left, as seen in Fig. 3, by the motor A. This operation continues until bridging member 27 of the contactor D breaks the circuit between long contacts 49 and 50 on the contact-carrier C, thus breaking the above described circuit through the motor B and stopping contact carrier C in a new adjusted position, that is, the normal or mid-point of the contact-carrier C has now been adjusted to a new mean position to serve to adjust the mean rate of supply of the current in the instant case to a new value calculated to compensate for the circumstances which caused the original drop in temperature. In the instant example, current is to be supplied to the furnace 1 at a greater rate than prior to the initiation of the operation of the control system.

Motor A will continue to operate to move the carriage 19 and the movable plate 18 carried thereby until the contactor D has moved to the new mid-position of the contact-carrier C and until the pairs of contacts 37—38, 39—40 and 41—42 are respectively connected. During this movement, the contacts 45 and 46 are connected for a time by member 27 on contactor D, but as relay 70 is already energized, nothing further happens at this time. When the contactor D has been moved so that its members 27, 28 and 29 are disposed centrally of contact-carrier C, all parts of the control system are rendered inoperative by the shunting of the solenoid coils of relay switches 69, 70 and 72. For this purpose contacts 37 and 38 are connected across the terminals of solenoid coil 106 of relay switch 69 by the conductors 117—120 and 137, respectively; contacts 39 and 40 are connected across the terminals of solenoid 109 of relay switch 72 by the conductors 117—121 and 150, respectively, and contacts 41 and 42 are connected across the terminals of solenoid coil 107 of relay switch 70 by conductors 117—122 and 140, respectively. The opening of the relay switch 72 will open the energizing circuit for the solenoid 108 of relay switch 71 and permit this switch to be restored to its original position by a suitable spring (not shown). The circuit which has been moving the motor A in the reverse direction to that in which it was originally moved will now be opened by the de-energization of the solenoid coil 108 of relay switch 71. Motor A cannot operate in the original direction unless the cam 10 is still in a position to connect contacts 63 and 64, in which event the entire cycle will be repeated. If the correction thus made has been sufficient, however, to restore conditions to the desired normal, cam 10 will by this time have been returned to its neutral position and switch contacts 63 and 64 will be opened, so that motor A will remain inactive until started again by the closing of some one or more of the cam switches.

Assuming now an opposite set of circumstances, namely, that in the instant case the temperature in the furnace 1 is greater than that desired by a small amount, perhaps 1 or 2 degrees. Under these circumstances exactly the reverse cycle takes place from that previously described, such reverse cycle being initiated by the movement of cam 9 in the direction indicated by the arrow in Fig. 2 to close the switch including contacts 61 and 62. This will start the motor A to move the movable plate 18 of the rheostat to the left, as seen in Fig. 3, the circuit being traceable in a manner similar to that above described. This also will cause the contactor D to move to the left, as seen in Fig. 3, with respect to the contact carrier C, which will first cause the connection of contact points 43 and 44 as seen in Fig. 2, to maintain the motor A in operation in the direction in which it was started, in this case by the energization of the relay switch 69, relay switch 70 not being energized during this entire cycle, and switches 69 and 70 having reciprocal function for this and the cycle initially described. The next step in this cycle is the connection of contact points 47 and 48, which starts operation of the motor B to move the contact-carrier C to the left, as seen in Fig. 3, the circuit for this motor being similar to that described above in connection with the cycle of operation as described in detail. The motor B will continue to operate as long as contacts 47 and 48 are connected together. When the contactor D has moved to connect contacts 55 and 56, no new action will occur unless the switch operated by cam 11 is closed, as described above, which is not the case where the difference between the desired conditions and those actually obtaining are small. When contacts 51 and 52 are connected together, the motor A will be reversed and caused to move toward its original position by a maintained circuit in a manner similar to that described above. The entire system will be restored to a neutral position when the contactor D again reaches the mid-position of the contact-carrier C by de-energizing the various solenoids in the manner above described.

Thus, it will be seen that when the magnitude of the condition being controlled is slightly different from the desired magnitude in one direction or the other, two distinct things occur, first the rate of supply of the medium which control the magnitude of the condition is changed or varied in a corrective direction by a relatively large amount due to the operation of the motor A, then this direction of movement or variation is reversed or the said rate is changed or varied in the reverse direction by a predetermined amount, namely, the amount necessary to bring the conductor D back to the mid-point of the contact-carrier C. The second of these things involves a relatively permanent adjustment in the mean rate of supply of the medium which controls the condition aforesaid, namely, by the movement of the contact-carrier C in response to operation of the motor B, which is likewise in a corrective direction, so that the return movement of the "large swing" as it may be called, or the reverse variation of the rate of supply of the condition-controlling medium is likewise less than the initial variation in such rate of supply and by a predetermined amount, namely, by an amount corresponding to the amount of movement of the contact-carrier C by the motor B.

We have provided additional means in connection with our control system for effecting a more rapid control than is possible by the means heretofore specifically described, such additional means becoming operative in the event that the differences between the actual conditions being controlled and the desired condition are of greater magnitude than is necessary to actuate the control of the system operated by cams 9 or 10. The purpose of this additional means is to effect more rapid return to the desired conditions than is possible with the apparatus above described. This additional means comprises cams 11 and 12 mounted on the cam shaft 8 and adapted to close their respective switches upon larger variations between the actual conditions and those desired than are required to actuate cams 9 or 10, respectively, the arrangement of the lobes on cams 11 and 12 being clearly shown on Fig. 2 of the drawings.

Considering the operation of these additional means, let us first consider a situation of the specific apparatus herein disclosed in which the temperature in the furnace 1 is a material amount lower than the desired temperature, so that the cam 10 is actuated to close its associate switch and connect the contacts 63 and 64 and also the cam 12 is moved to such an extent that it too will close its associated switch and connect contacts 67 and 68. The several operations will be initiated and carried on, as above described in detail, until the contactor D has been moved with respect to the contact-carrier C to a point such that the contact member 29 on the contactor D will engage and connect contacts 57 and 58. It will be noted from the above description that when the system is at this point in its cycle, the motor A is being actuated in a direction to move the carriage 19 and the movable plate 18 of the rheostat 4 to the right, as seen in Fig. 3, and also the motor B is being actuated to move the contact-carrier C to the right, as seen in Fig. 3, but by a slower movement than that of the movable plate 18 and the contactor D which moves therewith. Connection of the contacts 57 and 58 will be effective to stop the operation of the motor A by energization of the solenoid switch 73 thus leaving the motor B in operation to continue the movement of the contact-carrier C while interrupting the cycle as controlled by the operation of the motor A. The circuit for energizing the coil 110 of relay switch 73 may be traced as follows: starting with the line conductor 116, through conductor 118, contact 78, member 98 and contact 79 of the relay switch 69; conductors 129 and 130, contact 57 on the contact-carrier C, bridging member 29 of the contactor D; contact 58, conductor 134, contacts 67 and 68 of the switch operated by cam 12, conductor 131, resistance 115 and solenoid coil 110 of the relay switch 73 in series, and conductor 132 to line conductor 117. Movement of the member 105 caused by energization of the solenoid coil 110 of the relay switch 73 will break the normally closed connection between contacts 96 and 97 in the common connection including conductors 123 and 124 between the motor A and the line conductor 117. Thus, the motor A will be stopped, motor B continuing to move under the operation of the circuits heretofore described. The continued movement of motor B and hence of the contact-carrier C will move the contacts 57 and 58 away from beneath the member 29 of the contactor D, which will break the above described connection energizing relay switch 73 permitting that switch to be closed by a suitable spring (not shown), and hence will permit motor A to recommence its operation. The resumption of movement of the motor A will again bring the contactor D into engagement with the contacts 57 and 58 to stop the motor A by energization of the solenoid 110 of relay switch 73 as above described. This process will be repeated as long as the switch operated by cam 12 remains closed, which time will be substantially proportional to the magnitude of the difference between the actual conditions and those desired, whereby this correction will also be proportional to the time at which such large difference exists that is large enough to keep cam operated switch 12 closed.

An exactly similar sequence of operations occurs in connection with the switch operated by cam 11 when the actual conditions in the furnace 1 in the example chosen are materially higher than the desired condition. Under these circumstances, the switches operated by cams 9 and 11 will be closed. It is deemed unnecessary to trace the circuits in this direction as they are exactly similar to those above described with the exception that the switch operated by cam 11 and including contacts 65 and 66 is operated instead of the switch including contacts 67 and 68; and the contacts 55 and 56 on the contact-carrier are connected together instead of the contacts 57 and 58.

*Adjustability of system for special conditions*

Means are provided in connection with our system for adjusting various parts thereof to accommodate particular conditions which may be met in applying the system in different ways and to the control of various conditions. For example, the cams 9, 10, 11 and 12 may each be made individually angularly adjustable about the shaft 8, whereby in the case of cams 9 and 10, the neutral zone may be broadened in either direction from a predetermined point corresponding to a condition which may exactly be desired, so that a cycle of operations of the control system will not be started until a predetermined desired difference from the exact point desired is obtained, thus causing the control to be actuated less frequently where it is unnecessary to control the condition in question within such narrow limits as are obtainable with the finest setting of the parts. A similar result may be obtained by spacing the contacts 43 and 44 a greater or less distance from the mid-point of the contact-carrier C on the one hand and spacing contacts 45 and 46 a greater or less distance from such mid-point on the other hand, as it is necessary that these contacts be closed on one side or the other by the movement of the contactor D to a position to close one or the other pair of them in order that the control cycle be carried through. Thus, if for example the contacts 45 and 46 were spaced a predetermined distance from the mid-point of the contact-carrier C, the switch actuated by cam 10 might make and break several times, causing slight movement of the movable plate 18 of the rheostat and thus of the contactor D before a control cycle would be carried through.

A further possible adjustment is in the increment of movement of the permanent control, as it may be called, in the rate of supply of the condition-varying medium effected by a single cycle of operations of the control system, or in other words, an adjustment of the amount that motor B will move the contact-carrier C for one cycle of operation of the apparatus. This adjustment may be effected by moving the long contacts 49 and 50 on the one hand with respect to the reversing contacts 53 and 54, or moving long contacts 47 and 48 on the other hand with respect to the reversing contacts 51 and 52, thus controlling the time during which motor B can operate due to control of the time the contactor D may connect the long contacts on one side or the other.

In addition it may be desired to control the upper and lower limits of the "swing" in any one cycle, that is, assuming that the furnace 1 in the particular example described is too cold, it may be desired to control the maximum rate of supply of current to the furnace due to the movement of motor A in the first or corrective direction. This can be accomplished by variation in the position on the contact-carrier C of the reversing contacts 53 and 54 in the example chosen, or with regard to a too high furnace temperature and a desire to decrease it, by adjusting the position of contacts 51 and 52 toward or away from the mid-point of contact-carrier C. This control in practice determines the amount of heat supplied to compensate for different degrees of lag between the start of the time that new conditions exist in the furnace and the time the control system becomes responsive to such new conditions to correct them, in the particular example shown and described.

It may also be desired to control the minimum variation from the desired condition at which the secondary controls come into action, or in other words, the time at which the switches operated by cams 11 or 12 will be closed. This adjustment can be effected by adjusting the cams 11 or 12 about the cam shaft 8 in any suitable manner. Contacts 57 and 58 are preferably positioned so that they are located between the line of the left-hand ends of contacts 49 and 50 and the reversing contacts 53 and 54, as seen in Figs. 2 and 5; and contacts 55 and 56 are preferably so positioned as to be between the right-hand ends of contacts 47 and 48 and reversing contacts 51 and 52. It is also desirable that contacts 57—58 and 55—56 be as near as possible to their adjacent reversing contacts respectively. In other words, it is necessary that the interruption in the operation of the motor A occurs during the time it is being operated in its original or corrective direction.

Furthermore, adjustments may be made in the positions of the contacts on the contact-carrier C or in the positions of the cams 9, 10, 11 or 12 on the shaft 8, to differentiate between operations on one side or the other of the center or of the desired value. For example, it may be that a particular furnace requires the addition of more heat to raise its temperature by a certain amount than is required to be cut off in order that its temperature fall by the same amount. Under these circumstances it would be necessary that a greater amount of heat be supplied in order to make up for a given deficiency in temperature than need be cut off in order to allow the temperature to be reduced by the same amount. For this reason a differential adjustment in the positions of the several contacts on one side of the center of the contact-carrier C may be made with respect to the positions of corresponding contacts on the other side. Similar adjustments may be made in the positions of the several cams in order that the various controls be actuated differentially on the two sides of the desired condition.

*Example of operation of system—Fig. 7*

A chart shown in Fig. 7 represents by way of example a diagram of rate of supply of a condition controlling medium plotted as ordinates with respect to time as abscissæ. Starting at the left of the chart shown in Fig. 7 and assuming this chart to be one applied to the electric system described hereinbefore, $E^1$ represents a voltage value at which the control system is stabilized and inactive and the temperature in the furnace 1 is that desired. At some place between the points $a$ and $b$ a new circumstance enters the case and a greater amount of heat is required to maintain the temperature at the desired point, and the temperature in the furnace falls by a small amount. When we come to point $b$, the cam 10 has been actuated by the temperature responsive device to start the operation of the system, which results in a rapid rise in the rate of supply of current to the furnace, as shown between the points $b$ and $c$. At the point $c$ the motor A is reversed and there is shown from $c$ to $d$ a rapid reduction in the rate of supply of current. Meanwhile, however, the motor B has been in operation and has adjusted the position of the midpoint of the contact-carrier C, so that the contactor D does not return to its initial position, but to a position spaced from the position by one vertical space indicated on the chart. If at this time the cam 10 had returned to its neutral position due to conditions in the furnace having regained the desired condition, nothing further would happen, but, however, in the example operation chosen for illustration in Fig. 7, the cam 10 remains in its position keeping the contacts 63 and 64 connected, so that the cycle is repeated, as indicated from $d$ to $e$ to $f$, a second change having been made in the position of the contact-carrier C during this second cycle of the same magnitude as the change which took place in the first cycle and hence the voltage at point $f$ is two spaces above that at points $a$ and $b$. The cam 10 is still in a position to keep its associated switch closed and the control system starts on a third cycle of operations, as shown by the line $f$—$g$. At some place between the points $e$ and $g$ the cam 12 has been moved to show that a still greater amount of heat is required, and the contacts 67 and 68 brought together by the movement of the cam 12, so that the original cycle is interrupted and we have a portion shown at $g$—$h$ during which the motor A is repeatedly started and stopped, while the motor B remains in operation, but substantially no change occurs in the relative position of contactor D and contact-carrier C. At the point $h$ a sufficient correction has been effected in the temperature of the furnace due to the high average rate of power supply thereto, so that the cam 12 is brought back toward its neutral position to open connection between the contacts 67 and 68 permitting the original cycle to be completed by the reverse action of the motor A, indicated by the line $h$—$i$. In practice there may be a slight temporary increase in power substantially at the point $h$ above that shown, but this is only momentary and for a time during which the contactor D is traveling the very short distance between the line of contacts 57—58 and 53—54, as shown in Figs. 2 and 5. During this cycle a relatively greater change has taken place in the mean rate of power supply as will be indicated by the differences in ordinates of the points $f$ and $i$. When the system has returned to its normal position of the contactor D and contact-carrier C, the cam 10 is still in a position showing that the temperature is still too low and that more current is required. The cycle of the control system is repeated twice more, as shown at $i$—$j$—$k$ and $k$—$l$—$m$. When the system has gotten to the point $m$, the temperature of the furnace has reached the desired point, the cams are all in their neutral position, and voltage is being supplied at a rate $E^2$, which is that necessary to maintain the furnace at the desired temperature by compensating for new circumstances which caused the original drop in temperature, as for example, a door being opened in the furnace or the draft therethrough being changed in some manner, or perhaps due to the introduction of some relatively cold material. At this time the control system becomes inactive as the rate of current supplied to the furnace has now been adjusted to exactly that desired to maintain the temperature at the desired point so that no further control is necessary until the desired conditions are again disturbed.

While we have shown and described but one specific embodiment of our invention, it will be obvious that many applications may be made of the basic principles thereof, and that certain features included in the invention may be used to advantage without the use of the entire arrangement. We do not wish to be limited therefore except by the scope of the appended claims, which are to be construed as broadly as the state of the prior art permits.

I claim:

1. A control system, comprising an operating member, means for moving said member in one direction or the other in response to changes in the magnitude of a condition, adjustable means operable to maintain or change the magnitude of said condition, automatic means responsive to a variation of the position of said operating member from a predetermined position for adjusting said adjustable means, and means independent of the position of said member after the initiation of their operation for automatically controlling the operation of said automatic adjusting means to cause an automatic variation of the setting of said adjustable means in a corrective direction by a relatively large amount, then an automatic variation of said setting in the reverse direction by a predetermined amount, whereby to cause a quick corrective change in the magnitude of said condition to counteract the effect of the change obtained prior to the initiation of the operation of the means for correcting the magnitude of said condition.

2. A control system, comprising an operating member, means for moving said member in one direction or the other in response to changes in the magnitude of a condition, adjustable means operable to maintain or change the magnitude of said condition, automatic means responsive to a variation of the position of said operating member from a predetermined position for adjusting said adjustable means, and means independent of the position of said member after the initiation of their operation for automatically controlling the operation of said automatic adjusting means to cause an automatic variation of the setting of said adjustable means in a corrective direction by a relatively large amount, then an automatic variation of said setting in the reverse direction by a predetermined amount smaller than the amount of the first named automatic variation, whereby to cause a quick corrective change in the magnitude of said condition to bring it back quickly to the desired magnitude and whereby to effect a variation in the setting of said adjustable means in a direction to cause the maintenance of said condition at the desired magnitude by compensating for the circumstances which caused said operating member to change its position.

3. A control system, comprising an operating member, means for moving said member in one direction or the other in response and in proportion to changes in the magnitude of a condition, adjustable means operable to maintain or change the magnitude of said condition, automatic means responsive to a predetermined relatively small variation of the position of said operating member from a predetermined position for adjusting said adjustable means, means for automatically controlling the operation of said automatic adjusting means to cause an automatic variation of the setting of said adjustable means in a corrective direction by a relatively large amount, then an automatic variation of said setting in the reverse direction by an amount smaller than the amount of the first named automatic variation, and means responsive to relatively larger variations of said operating member from its said predetermined position for variably determining the amount of the variation of said setting in the said reverse direction to cause the difference in the amounts of the variations of the setting in the first and reversed directions to be a function of the variation of said operating member from its said predetermined position such that when the last named variation increases, the difference between the variation of said setting in the first and reversed direction also increases.

4. A control system, comprising an operating member, means for moving said member in one direction or the other in response and in proportion to changes in the magnitude of a condition, adjustable means operable to maintain or change the magnitude of said condition, automatic means responsive to a predetermined relatively small variation of the position of said operating member from a predetermined position for adjusting said adjustable means, means for automatically controlling the operation of said automatic adjusting means to cause an automatic variation of the setting of said adjustable means in a corrective direction by a relatively large amount, then an automatic variation of said setting in the reverse direction by an amount smaller than the amount of the first named automatic variation, and means responsive to relatively larger variations in the position of said operating member from its said predetermined position for varably determining the amount of variation of said setting in the said reverse direction to cause the difference in the amounts of the variations of said setting in the first and reversed directions to be substantially proportional to the time period during which said operating member remains in a position removed from its said predetermined position by a certain minimum amount.

5. A control system, comprising an operating member, means for moving said member in one direction or the other in response to changes in the magnitude of a condition, adjustable means operable to maintain or change the magnitude of said condition, automatic means responsive to a variation of the position of said operating member from a predetermined position for adjusting said adjustable means, means for automatically controlling the operation of said automatic adjusting means to cause an automatic variation of the setting of said adjustable means in a corrective direction by a relatively large amount, then an automatic variation of said setting in the reverse direction by a predetermined amount smaller than the amount of the said first named automatic variation, and means for selectively determining the difference between the first and reverse variations, whereby to determine the variation in the setting of said adjustable means caused by the operation of the control system through a single cycle due to a variation of the position of said operating member from its predetermined position.

6. A control system, comprising an operating member, means for moving said member in one direction or the other in response to changes in the magnitude of a condition, adjustable means operable to maintain or change the magnitude of said condition, automatic means responsive to a variation of the position of said operating member from a predetermined position for adjusting said adjustable means, means for automatically controlling the operation of said automatic adjusting means to cause an automatic variation of the setting of said adjustable means in a corrective direction by a relatively large amount, then an automatic variation of said setting in the reverse direction by a predetermined amount, and means for causing the control system to complete a cycle of operation including the variations of said setting in the corrective and reverse directions by the desired amounts as aforesaid independently of the duration of the variation of said member from its said predetermined position.

7. A control system, comprising an operating member, means for moving said member in one direction or the other in response to changes in the magnitude of a condition, adjustable means operable to maintain or change the magnitude of said condition, automatic means responsive to a variation of the position of said operating member from a predetermined position for adjusting said adjustable means, means for automatically controlling the operation of said automatic adjusting means to cause an automatic variation of the setting of said adjustable means in a corrective direction by a relatively large amount, then an automatic variation of said setting in the reverse direction by a predetermined amount, and means for adjustably determining the extent of said relatively large amount of variation, whereby variably to determine the total effect of the quick corrective change made by the aforesaid means in the magnitude of said condition to compensate for different degrees of change obtained prior to the initiation of the operation of the means for correcting the magnitude of said condition.

8. A control system, comprising an operating member, means for moving said member in one direction or the other in response to changes in the magnitude of a condition, adjustable means operable to maintain or change the magnitude of said condition, automatic means responsive to a variation of the position of said operating member from a predetermined position for adjusting said adjustable means, means for automatically controlling the operation of said automatic adjusting means to cause an automatic variation of the setting of said adjustable means in a corrective direction by a relatively large amount, then an automatic variation of said setting in the reverse direction by a predetermined amount smaller than the amount of the first named automatic variation, means for adjustably determining the extent of said relatively large amount of variation, and means independent of the last named means for selectively determining the difference between the first and reversed variations.

9. A control system, comprising an operating member, means for moving said member in one direction or the other in response and in proportion to changes in the magnitude of a condition, adjustable means operable to maintain or change the magnitude of said condition, automatic means responsive to a predetermined relatively small variation of the position of said operating member from a predetermined position for adjusting said adjustable means, means for automatically controlling the operation of said automatic adjusting means to cause an automatic variation of the setting of said adjustable means in a corrective direction by a relatively large amount, then an automatic variation of said setting in a reverse direction by an amount smaller than the amount of the first named automatic variation, means responsive to relatively larger variations in the position of said operating member from its said predetermined position for variably determining the amount of the variation of said setting in the said reverse direction, and means for selectively determining the minimum variation of the magnitude of said condition from the desired magnitude at which the last named means becomes operative.

10. A control system, comprising an operating member, means for moving said member in one direction or the other in response and in proportion to changes in the magnitude of a condition, adjustable means operable to maintain or change the magnitude of said condition, automatic means responsive to a variation of the position of said operating member from a predetermined position for adjusting said adjustable means, means for selectively determining the amount said operating member must vary from its said predetermined position before being effective to actuate said automatic adjusting means, means for automatically controlling the operation of said automatic adjusting means to cause an automatic variation of the setting of said adjustable means in a corrective direction by a relatively large amount, then an automatic variation of said setting in the reverse direction by a predetermined amount, and means for selectively determining said relatively large amount, whereby to cause a quick corrective change in the magnitude of said condition which change is variable to compensate for the effect of the change obtained in the magnitude of said condition prior to the initiation of the operation of the means for correcting such magnitude.

11. A control system, comprising an operating member, means for moving said member in one direction or the other in response to changes in the magnitude of a condition, adjustable means operable to maintain or change the magnitude of said condition, automatic means responsive to a variation of the positon of said operating member from a predetermined position for adjusting said adjustable means, means for automatically controlling the operation of said automatic adjusting means to cause an automatic variation of the setting of said adjustable means in a corrective direction by a relatively large amount, then an automatic variation of said setting in the reverse direction by an amount predetermined in respect to said relatively large amount, and means for independently and adjustably determining the amount of the corrective change for effecting a correction to increase or reduce the magnitude of said condition respectively.

12. A control system, comprising an operating member, means for moving said member in one direction or the other in response to changes in the magnitude of a condition, adjustable means operable to maintain or change the magnitude of said condition, automatic means responsive to a variation of the position of said operating member from a predetermined position for adjusting said adjustable means, means for automatically controlling the operation of said automatic adjusting means to cause an automatic variation of the setting of said adjustable means in a corrective direction by a relatively large amount, then an automatic variation of said setting in the reverse direction by an amount smaller than the amount of the first named automatic variation by a predetermined amount, and means for independently and selectively determining the variations of said setting in a corrective direction for increasing or decreasing the magnitude of said condition respectively.

13. A control system, comprising an operating member, means for moving said member in one direction or the other in response to changes in the magnitude of a condition, adjustable means operable to maintain or change the magnitude of said condition, automatic means responsive to a variation of the position of said operating member from a predetermined position for adjusting said adjustable means, means for automatically controlling the operation of said automatic adjusting means to cause an automatic variation of the setting of said adjustable means in a corrective direction by a relatively large amount, then an automatic variation of said setting in a reverse direction by an amount smaller than the corrective variation by a predetermined amount, and means for independently and adjustably determining the difference between the variation in the corrective direction and in the reverse direction according as the correction required is to increase or decrease the magnitude of said condition respectively.

14. A control system, comprising an operating member, a temperature responsive device for moving said member in one direction or the other according as the temperature in a predetermined region rises or falls, means operable adjustably to control the rate of supply of a heating medium to said region to mantain or change the temperature thereof, automatic means responsive to a variation of the position of said operating member in response to a variation of the temperature in said region from a predetermined value for varying the rate of supply of the heating medium to said region, and means independent of the position of said member after the initiation of their operation for automatically controlling the operation of the last named means to cause an automatic variation in the rate of supply of the heating medium to said region in a corrective direction by a relatively large amount, then an automatic variation in said rate of supply in a reverse direction by a predetermined amount, whereby to effect a quick corrective change in the temperature in said region to counteract the effect of the temperature change obtained prior to the initiation of the operation of the control system for correcting the temperature in said region.

15. A control system, comprising an operating member, a temperature responsive device for moving said member in one direction or the other according as the temperature in a predetermined region rises or falls, means operable adjustably to control the rate of supply of a heating medium to said region to maintain or change the temperature thereof, automatic means responsive to a variation of the position of said operating member in response to a variation of the temperature in said region from a predetermined value for varying the rate of supply of the heating medium to said region, and means independent of the position of said member after the initiation of their operation for automatically controlling the operation of the last named means to cause an automatic variation in the rate of supply of the heating medium to said region in a corrective direction by a relatively large amount, then an automatic variation in said rate of supply in a reverse direction by a predetermined amount smaller than the amount of the first named automatic variation, whereby to cause a quick corrective change in the temperature in said region to bring it back quickly to the desired temperature and whereby to effect a variation in the mean rate of supply of the heating medium to said region in a direction to cause the maintenance of the temperature in the region at the desired point by compensating for the circumstances which caused said operating member to change its position.

16. A control system, comprising an operating member, a temperature responsive device for moving said member in one direction or the other according as the temperature in a predetermined region rises or falls and in amount according to the amount of such rise or fall, means operable adjustably to control the rate of supply of a heating medium to said region to maintain or change the temperature thereof, automatic means responsive to a predetermined relatively small variation of the position of said operating member in response to a relatively small variation in the temperature of said region from a predetermined desired value for varying the rate of supply of the heating medium to said region, means for automatically controlling the operation of the last named means to cause an automatic variation in the rate of supply of the heating medium to said region in a corrective direction by a relatively large amount, then an automatic variation of said rate of supply in a reverse direction by an amount smaller than the amount of the first named automatic variation, and means responsive to relatively larger variations in the position of said operating member in response to corresponding variations in the temperature in said region from the desired temperature for variably determining the amount of variation of the rate of supply of the heating medium in said reverse direction, whereby the difference in the amounts of variation of said rate of supply in the first and reversed directions may be substantially proportional to the time period during which the temperature in said region remains different from the desired value by a predetermined minimum amount.

17. A control system, comprising an operating member, a temperature responsive device for moving said member in one direction or the other according as the temperature in a predetermined region rises or falls, means operable adjustably to control the rate of supply of a heating medium to said region to maintain or change the temperature thereof, automatic means responsive to a variation of the position of said operating member in response to a variation of the temperature in said region from a predetermined value for varying the rate of supply of the heating medium to said region, means for automatically controlling the operation of the last named means to cause an automatic variation in the rate of supply of the heating medium to said region in a corrective direction by a relatively large amount, then an automatic variation of said rate of supply in a reverse direction by a predetermined amount smaller than the amount of the first named automatic variation, and means for selectively determining the difference between the first and reverse variations in the rate of supply of the heating medium to said region, whereby selectively to determine the variation in the rate of supply of the heating medium caused by the operation of the control system through a single cycle due to variation of the position of said operating member from its predetermined desired position.

18. A control system comprising an operating member, a temperature responsive device for moving said member in one direction or the other according as the temperature in a predetermined region rises or falls, means operable adjustably to control the rate of supply of a heating medium to said region to maintain or change the temperature thereof, automatic means responsive to a variation of the position of said operating member in response to a variation of the temperature in said region from a predetermined value for varying the rate of supply of the heating medium to said region, means for automatically controlling the operation of the last named means to cause an automatic variation in the rate of supply of the heating medium to said region in a corrective direction by a relatively large amount, then an automatic variation in said rate of supply in a reverse direction by a predetermined amount, and means for causing the control system to complete a cycle of operation including the variation of the said rate of supply in the corrective and reverse directions by the desired amounts as aforesaid independently of the duration of the variation of the position of said member from its predetermined position corresponding to the desired temperature in said region.

19. A control system, comprising an operating member, a temperature responsive device for moving said member in one direction or the other according as the temperature in a predetermined region rises or falls, means operable adjustably to control the rate of supply of a heating medium to said region to maintain or change the temperature thereof, automatic means responsive to a variation of the position of said operating member in response to a variation of the temperature in said region from a predetermined value for varying the rate of supply of the heating medium to said region, means for automatically controlling the operation of the last named means to cause an automatic variation in the rate of supply of the heating medium to said region in a corrective direction by a relatively large amount, then an automatic variation in said rate of supply in a reverse direction by a predetermined amount, and means for adjustably determining said relatively large amount of variation, whereby variably to determine the total effect of the quick corrective change made by the aforesaid means in the rate of supply of the heating medium to said region to compensate for different degrees of change obtained in the heat conditions of said region prior to the initiation of the operation of the means for correcting the rate of supply of the heating medium thereto.

20. A control system, comprising an operating member, a temperature responsive device for moving said member in one direction or the other according as the temperature in a predetermined region rises or falls, means automatically adjustable to control the rate of supply of a heating medium to said region to maintain or change the temperature thereof, automatic means responsive to a variation of the position of said operating member in response to a variation of the temperature in in said region from a predetermined value for varying the rate of supply of the heating medium to said region, means for automatically controlling the operation of the last named means to cause an automatic variation in the rate of supply of the heating medium to said region in a corrective direction by a relatively large amount, then an automatic variation in said rate of supply in a reverse direction by a predetermined amount smaller than the amount of the first named automatic variation, means for adjustably determining said relatively large amount of variation, and means independent of the last named means for selectively determining the difference between the first and reversed variations.

21. A control system, comprising an operating member, a temperature responsive device for moving said member in one direction or the other according as the temperature in a predetermined region rises or falls and in an amount according to the amount of such rise or fall, means operable adjustably to control the rate of supply of a heating medium to said region to maintain or change the temperature thereof, automatic means responsive to a predetermined relatively small variation of the position of said operating member in response to a relatively small variation in the temperature of said region from a predetermined desired temperature for varying the rate of supply of the heating medium to said region, means for automatically controlling the operation of the last named means to cause an automatic variation in the rate of supply of the heating medium to said region in a corrective direction by a relatively large amount, then an automatic variation of said rate of supply in a reverse direction by an amount smaller than the amount of the first named automatic variation, means responsive to relatively larger variations in the position of said operating member in response to corresponding variations in the temperature of said region from the desired temperature for variably determining the amount of the variation of the rate of supply of the heating medium in a said reverse direction and means for selectively determining the minimum variation of temperature from the desired temperature at which the last named means becomes operative.

22. A control system, comprising an operating member, a temperature responsive device for moving said member in one direction or the other according as the temperature in a predetermined region rises or falls, means operable adjustably to control the rate of supply of a heating medium to said region to maintain or change the temperature thereof, automatic means responsive to a variation of the position of said operating member in response to a variation in the temperature of said region from a predetermined desired value for varying the rate of supply of the heating medium to said region, means for selectively determining the amount said operating member must vary from its predetermined position corresponding to the desired temperature in said region before being effective to actuate the heating medium rate varying means, means for automatically controlling the operation of the heating medium rate varying means to cause an automatic variation in the rate of supply of the heating medium to said region in a corrective direction by a relatively large amount, then an automatic variation in said rate of supply in a reverse direction by a predetermined amount, and means for selectively determining said relatively large amount, whereby to cause a quick corrective change in the temperature in said region adjustable to compensate for the effect of the change obtained in the heat conditions of said region prior to the initiation of the operation of the means for correcting such heat conditions and restoring the desired temperature in the region.

23. A control system for maintaining a predetermined desired temperature in a region, comprising a temperature responsive device subject to the temperature in the region, a shaft associated with said device, means controlled by said device for rotating said shaft in one direction or the other and in a degree proportional to the direction and degree of the change of temperature in said region, cams secured to said shaft, means for adjustably controlling the rate of supply of a heating medium to said region, a reversible electric motor for operating the last named means, electric circuits for operating said motor in either direction, switches for said circuits adapted to be selectively closed by one or another of said cams, and additional automatic means independent of the position of said shaft after the initiation of their operation and including an electric circuit, a switch and a relay for starting and maintaining said motor in operation to vary the rate of supply of the heating medium in a corrective direction by a predetermined relatively large amount, and thereafter immediately and independently of the position or movement of said shaft to operate said motor in a reverse direction to cause it to vary the rate of supply of said heating medium by a predetermined amount.

24. A system for controlling the temperature in a heated region, comprising a device responsive to the temperature in said region, an operating member, means controlled by said device for moving said member in one direction or the other according as the temperature in said region rises or falls, means for adjustably controlling the rate of supply of a heating medium to said region, automatic means responsive to a movement of said operating member from a predetermined normal position at which the temperature in said region is at the desired value for controlling the operation of said adjustable rate controlling means, said automatic means including electric circuits, a reversible electric motor connected in said circuits and adapted directly to actuate the means for adjustably controlling the rate of supply of heating medium to said region, means controlled by variation of said operating member from its neutral position in one direction or the other to close a circuit through said motor to operate it in one direction or the other respectively for increasing or decreasing the rate of supply of heating medium to said region, and means including electric circuits responsive to the variation of said operating member from its neutral position in one direction or the other for initiating and maintaining the operation of said motor to adjust said rate in a corrective direction to effect a predetermined relatively large variation in the rate of supply of the heating medium to said region and thereafter to operate said motor in a reverse direction to effect a predetermined smaller variation in the rate of supply of the heating medium, whereby when the last named operation of said motor has ceased, the rate of supply of the heating medium has been permanently changed in a corrective direction to supply heating medium to said region at a new rate calculated to maintain said region at the desired temperature by compensating for the circumstances which caused the operating member to change its position and also whereby the desired temperature will be quickly restored by the relatively large temporary variation in the rate of supply of heating medium to said region compensating for the lag between the establishment of the new conditions and the time the temperature responsive device becomes sensitive to such new conditions.

25. A control system for maintaining a predetermined desired temperature in a region, comprising a temperature responsive device subject to the temperature in said region, an operating member, means controlled by said device for moving said member in one direction or the other according as the temperature in said region rises or falls, means adjustable to control the rate of supply of a heating medium to said region for maintaining or changing the temperature therein, a system of electric circuits, a contractor member arranged to be moved in synchronism with the heating medium rate controlling means, a contact-carrying member, a plurality of contacts on said contact-carrying member connected in certain of said electric circuits, a reversible electric motor connected in certain of said circuits for operating the heating medium rate controlling means, switches arranged to be closed respectively by movement of said operating member in one direction or the other to initiate the operation of said motor in one direction or the other, means responsive to a predetermined differential movement of said contactor member and said contact-carrying member to maintain said motor in operation in the direction in which it is started for a predetermined period irrespective of an earlier opening of the switch by which the motor was started, means for reversing the direction of operation of said motor after the contactor and contact-carrying members have been relatively moved to a predetermined position relative to one another in either direction, means for maintaining said motor in operation in the reversed direction until the contactor and contact-carrying members have been restored to their initial neutral position relative to one another, and means to restore the electrical system to its normal inactive position when said contactor and contact-carrying members have regained their initial neutral relative positions if said switches have meanwhile all been opened.

26. A control system for maintaining a predetermined desired temperature in a region, comprising a temperature responsive device subject to the temperature in said region, an operating member, means controlled by said device for moving said member in one direction or the other according as the temperature in said region rises or falls, means adjustable to control the rate of supply of a heating medium to said region for maintaining or changing the temperature therein, a system of electric circuits, a contactor member arranged to be moved in synchronism with the heating medium rate controlling means, a contact-carrying member, a plurality of contacts on said contact-carrying member connected in certain of said electric circuits, a reversible electric motor connected in certain of said circuits for operating the heating medium rate controlling means, switches arranged to be closed respectively by movement of said operating member in one direction or the other to initiate the operation of said motor in one direction or the other, means responsive to a predetermined differential movement of said contactor member and said contact-carrying member to maintain said motor in operation in the direction in which it is started for a predetermined period irrespective of an earlier opening of the switch by which the motor was started, means for reversing the direction of operation of said motor after the contactor and contact-carrying members have been relatively moved to a predetermined position relative to one another in either direction, means for maintaining said motor in operation in the reversed direction until the contactor and contact-carrying members have been restored to their initial neutral position relative to one another, means to restore the electrical system to its normal inactive position when said contactor and contact-carrying members have regained their initial neutral relative positions, if said switches have meanwhile all been opened, and automatic means for effecting a predetermined adjustment of the position of said contact-carrying member during certain portions of the time said motor is in operation, whereby to effect a permanent adjustment in the normal rate of supply of the heating medium to said region.

27. A control system for maintaining a predetermined desired temperature in a region, comprising a temperature responsive device subject to the temperature in said region, an operating member, means controlled by said device for moving said member in one direction or the other according as the temperature in said region rises or falls, means adjustable to control the rate of supply of a heating medium to said region for maintaining or changing the temperature therein, a system of electric circuits, a contactor member arranged to be moved in synchronism with the heating medium rate controlling means, a contact-carrying member, a plurality of contacts adjustably mounted on said contact-carrying member and connected in certain of said electric circuits, a reversible electric motor connected in certain of said circuits for operating the heating medium rate controlling means, switches arranged to be closed respectively by movement of said operating member in one direction or the other to initiate the operation of said motor in one direction or the other, means responsive to a predetermined differential movement of said contactor member and said contact-carrying member to maintain said motor in operation in the direction in which it is started for a predetermined period irrespective of an earlier opening of the switch by which the motor was started, means for reversing the direction of operation of said motor after the contactor and contact-carrying members have been relatively moved to a predetermined position relative to one another in either direction, means for maintaining said motor in operation in the reversed direction until the contactor and contact-carrying members have been restored to their initial neutral position relative to one another, means to restore the electrical system to its normal inactive position when said contactor and contact-carrying members have regained their initial neutral relative positions if said switches have meanwhile all been opened, and independent means for manually adjusting the position of certain of said contacts with respect to said contact-carrying member.

28. In a system for regulating the temperature within a region having means for controlling the rate of supply of a heating medium thereto, a motor for operating said means, a main electric circuit, means in the latter for causing the motor to increase said rate of supply in response to a decrease in the temperature within the region, and other means automatically operated within a given time interval for subsequently causing the motor to decrease the said rate of supply to a lesser extent than the said increase thereof, whereby to balance the rate of supply of the medium to the rate of demand thereof required by the said decrease in the temperature.

29. In a system for regulating the temperature within a region having a means for controlling the rate of supply of a heating medium thereto, a motor for operating said means, a main electric circuit, means in the latter for causing the motor to decrease the rate of supply of the temperature controlling medium in response to an increase in the temperature within the region, and other means automatically operated within a given time interval for subsequently causing the motor to increase the rate of supply of the medium to a lesser extent than the said decrease thereof, whereby to balance the rate of supply of the medium to the rate of demand thereof required by the said increase in the temperature.

30. In a system for regulating the temperature within a region having a means for controlling the rate of supply of the temperature controlling medium thereto, a motor for operating the means to control the rate of supply of the temperature controlling medium, an electric circuit, means in the circuit to cause said motor to operate the first-named means in a certain direction in response to a change in the temperature within the region, a switch mechanism in said circuit for subsequently causing said motor to again operate the first named means within a predetermined time interval in the opposite direction to a lesser extent than the said first operation, and means operated by the motor to actuate said switch mechanism.

Signed at Hartford, Connecticut, this 12th day of December, 1930.

HAROLD A. WADMAN.
HAROLD W. McINTOSH.